United States Patent Office 3,102,120
Patented Aug. 27, 1963

3,102,120
METHOD FOR PRODUCTION OF INDOLINE-6-SULFONYLUREAS
Hermann Breuer and Hans Höhn, Regensburg, Germany, assignors to Olin Mathieson Chemical Corporation, New York, N.Y., a corporation of Virginia
No Drawing. Filed May 29, 1962, Ser. No. 198,461
Claims priority, application Germany June 29, 1961
7 Claims. (Cl. 260—319)

This invention relates to an improved method for the production of indoline-6-sulfonylureas of the formula

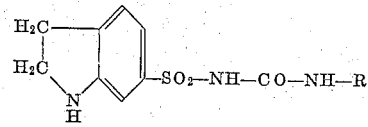
(I)

wherein R represents alkyl, alkenyl, aryl, aralkyl, cycloalkyl, cycloalkyl-alkyl, alkoxyalkyl and alkylthioalkyl.

Illustrative of the substituents represented by the symbol R are straight and branched chain lower alkyl groups such as methyl, ethyl, propyl, isopropyl, butyl, tertiary butyl and the like; aryl groups, e.g. naphthyl, phenyl and monosubstituted phenyl groups such as halophenyl, for example p-chlorophenyl, p-bromophenyl, lower alkoxyphenyl, for example methoxyphenyl, lower alkylphenyl, for example tolyl and the like; aralkyl groups, especially phenyl-lower alkyl groups such as benzyl and substituted phenyl-lower alkyl wherein the aryl portion is the same as those enumerated above; lower alkenyl groups such as allyl, butenyl and the like; cycloalkyl groups, especially those having 4 to 6 carbon atoms such as cyclobutyl, cyclopentyl and cyclohexyl; cycloalkyl groups of the type described attached to lower alkyl groups of the kind described above, for example cyclopentylmethyl, cyclohexylethyl and the like; alkoxyalkyl, especially lower alkoxy-lower alkyl substituents containing lower alkoxy groups of the type described, for example methoxymethyl, methoxyethyl, ethoxymethyl and the like; and similar lower alkylthio-lower alkyl groups, for example methylmercaptomethyl, ethylmercaptomethyl and the like. Representative salts include alkali metal and alkaline earth metal salts such as sodium, potassium, calcium and barium salts.

The compounds obtained according to this invention are hypoglycemic agents with long duration of action which are effective in lowering blood sugar and are therefore useful as oral anti-diabetic agents. The compounds of Formula I or pharmaceutically acceptable salts thereof may be administered orally in conventional dosage forms such as tablets, capsules and the like.

According to a method previously disclosed, compounds of Formula I are produced from indolinesulfonamide or a 1-acyl derivative thereof by forming the sulfonyl urea group on the preformed indoline ring. It has now been found that it is advantageous to form the indole ring as the last stage in the formation of such compounds.

The starting materials for the preparation of compounds of Formula I in accordance with this invention are 3-nitro-4-(β-haloethyl)benzenesulfonamides of the formula

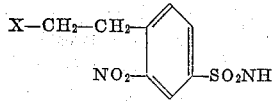
(II)

wherein X represents halogen.

These starting materials are formed from a 4-(β-haloethyl)benzenesulfonyl chloride of the formula

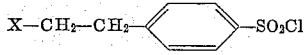
(III)

wherein X represents halogen, by nitrating to form the 3-nitro-4-(β-haloethyl)benzenesulfonamide derivative of the formula

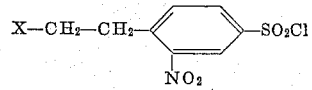
(IV)

and the latter, in turn, is converted to the compound of Formula II by amination, e.g. with ammonia.

The nitration may be effected with concentrated potassium nitrate preferably in the presence of a dehydrating agent such as concentrated sulfuric acid. A solution of potassium nitrate in concentrated sulfuric acid is preferable. The nitration may be carried out at room temperature or slightly above. A temperature of about 30 to 40° C. should not be exceeded. It is not essential to use a pure 4-(β-haloethyl)benzenesulfonyl halide as starting material. The crude reaction product resulting from the sulfohalogenation of a β-haloethylbenzene may be used equally well without affecting the yield of the 3-nitro-4-(β-haloethyl)benzenesulfonyl halide.

The crude sulfonyl halide, which is obtained from the nitration reaction mixture with ice water, need not be isolated in pure form for further use in the process. It can, however, be purified by recrystallization, if desired. This product is then converted into the corresponding benzenesulfonamide, for example by reaction with concentrated aqueous ammonia preferably in the cold.

These starting materials may be converted to 3-nitro-4-(β-haloethyl)benzenesulfonyl ureas of the following formula

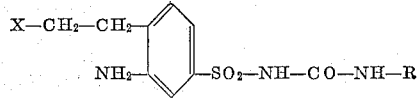
(V)

wherein X and R have the previously defined meanings, by any of several methods.

For example, the 3-nitro-4-(β-haloethyl)benzenesulfonamide of Formula II may be reacted in the presence of alkali with an isocyanate of the general formula

wherein R has the same meaning as above, or alternatively, the 3-nitro-4-(β-haloethyl)benzenesulfonamide may be converted to the corresponding 3-nitro-4-(β-haloethyl)benzenesulfonyl urethane and reacting the urethane with an amine of the formula R—NH₂ to obtain the sulfonylurea.

The 3-nitro-4-(β-haloethyl)benzenesulfonyl urea of Formula V is then, according to this invention, reduced to the 3-amino-4-(β-haloethyl)benzenesulfonyl urea of the formula

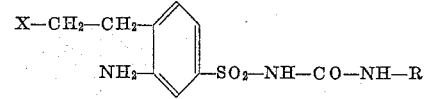
(VI)

wherein X and R have the previously defined significance.

The reduction of the nitro group to the amino group may be effected by any of the conventional methods used for this purpose. It must be remembered, however, that the sulfonylureas are unstable under certain conditions, especially in very acid solutions and at highly elevated temperature and care must be exercised in that direction. Reduction with hydrogen in the presence of a catalyst, especially a metal of group VIII of the periodic system, is particularly advantageous for this purpose.

The 3-nitro-4-(β-haloethyl)benzenesulfonyl urea is then, according to an especially preferred modification of this invention, catalytically hydrogenated preferably in suspension, since the substance is only slightly soluble in the common solvents used for catalytical hydrogenation. Suitable reaction media include lower aliphatic alcohols and their esters with lower fatty acids. The temperature of hydrogenation should not exceed room temperature since in some cases hydrogen halide splits off and leads to side reactions so that the yield suffers. In general, it is preferable to carry out the hydrogenation at about 0 to about 10° C.

The hydrogenation gives practically quantitative results. The resulting 3-amino-4-($\beta$-haloethyl)benzenesulfonyl urea of the Formula VI may be readily isolated. However, isolation and purification of the substance is not necessary prior to the next step of the synthesis.

Cyclization to form the indoline-6-sulfonyl urea of Formula I is attained by heating the intermediate of Formula VI to an elevated temperature, e.g. about 100° C. Since the hydrohalic acid freed in the reaction readily leads to side reactions, it is desirable to effect the ring closure in the presence of an acid binding agent. The indoline-6-sulfonylurea may then, for example, be dissolved in dilute aqueous alkali hydroxide and the solution warmed on a water bath. By acidification, pure indoline-6-sulfonylurea may be obtained therefrom.

The indoline-6-sulfonylurea may also be produced, according to this invention, in a single reaction step from 3-nitro-4-($\beta$-haloethyl)benzenesulfonylurea by catalytically reducing the latter with hydrogen in aqueous solution in the presence of an acid binding agent. In this case reduction of the nitro group as well as ring closure to the indoline nucleus occur simultaneously.

The following examples are illustrative of the invention. All temperatures are in degrees centigrade.

Example 1

175 grams of 4-($\beta$-chloroethyl)benzenesulfonyl chloride (M.P. 54–56°) is added gradually with vigorous stirring at 20 to 30° to a mixture of 280 grams of anhydrous potassium nitrate and 420 grams of concentrated sulfuric acid. Ice cooling is used to prevent the temperature from exceeding 30°. The reaction mixture is then vigorously stirred at 25 to 30° for an additional 2 hours. The reaction mixture is poured with stirring into a mixture of ice and water whereupon 3-nitro-4-($\beta$-chloroethyl)benzenesulfonyl chloride precipitates. The product is filtered under suction and is washed with water. The damp filtrate residue is introduced with vigorous stirring into an ice cooled mixture of 600 ml. of concentrated ammonia and 600 ml. of water and stirred for another 3 hours. The product, 3-nitro-4-($\beta$-chloroethyl)-benzenesulfonamide, is filtered under suction. After drying, 168 grams of crude product are obtained which have a melting point of 165–166°. After recrystallization from ethyl acetate the M.P. is 166–167°.

Example 2

31.2 grams of 3-nitro-4-($\beta$-chloroethyl)benzenesulfonamide and 60 ml. of 2 N sodium hydroxide solution are dissolved in 150 ml. of acetone. 20 grams of cyclohexyl isocyanate are added to the solution dropwise at a temperature of 10° over a period of 50 minutes. The reaction mixture is permitted to stand for 3 hours. It is then diluted with water to a volume of 800 ml., the acetone is distilled off in vacuo and the residue is filtered. The addition of dilute hydrochloric acid to the filtrate precipitates the product, 1-[3-nitro-4-($\beta$-chloroethyl)benzenesulfonyl]-3-cyclohexylurea. The crude material is purified by dissolving in 1% ammonia, filtering the solution and reprecipitating the product from the filtrate with dilute hydrochloric acid. There are obtained 34.9 grams of material which, upon recrystallization from acetone in water, melts at 161–162°.

Example 3

By substituting n-butyl isocyanate for the cyclohexyl isocyanate in the procedure of Example 2, 1-[3-nitro-4-($\beta$-chloroethyl)benzenesulfonyl]-3-n-butylurea, M.P. 157–158° is obtained.

Example 4

20 grams of 1-[3-nitro-4-($\beta$-chloroethyl)benzenesulfonyl]-3-n-butylurea are suspended in 200 ml. of ethyl acetate and the suspension is hydrogenated in the presence of Raney nickel catalyst under normal pressure and at room temperature until hydrogen uptake ceases. The catalyst is separated by filtration and the filtrate is concentrated in vacuo at about 20°. A portion of the resulting 1-[3-amino-4-($\beta$-chloroethyl)benzenesulfonyl]-3-butylurea is recrystallized from ethanol-water and melts at 104 to 105°. For further use of the material, the crude product is dissolved in 400 ml. of 0.5 N sodium hydroxide solution and the solution is heated on a boiling water bath for one hour. The solution is cooled and the product is precipitated with dilute acetic acid. 14.7 grams of 1-(indoline-6-sulfonyl)-3-n-butylurea, melting at 151–153°, are obtained.

Example 5

3.89 grams of 1-[3-nitro-4-($\beta$-chloroethyl)benzenesulfonyl]-3-cyclohexyl urea are dissolved in 110 ml. of 0.2 N aqueous ammonia and catalytically hydrogenated in the presence of Raney nickel catalyst at room temperature and normal pressure. After 90 minutes, the theoretical amount of hydrogen is taken up. After separation of the catalyst by filtration, the filtrate is acidified with dilute acetic acid and the precipitate is purified by reciprocating several times. The yield of 1-(indoline-6-sulfonyl)-3-cyclohexylurea amounts to 2.9 grams. After recrystallization from methanol, the product melts at 170–175°, with dec.

Example 6

By substituting the appropriate isocyanate in the procedure of Example 2 and proceeding further as in Example 4, the following additional compounds are obtained:

1-(indoline-6-sulfonyl)-3-allylurea
1-(indoline-6-sulfonyl)-3-phenylurea
1-(indoline-6-sulfonyl)-3-benzylurea
1-(indoline-6-sulfonyl)-3-cyclopentylmethylurea
1-(indoline-6-sulfonyl)-3-methoxymethylurea
1-(indoline-6-sulfonyl)-3-ethylmercaptomethylurea
1(indoline-6-sulfonyl)-3-tolylurea
1-(indoline-6-sulfonyl)-3-p-chlorophenylurea

What is claimed is:

1. A process for the production of indoline-6-sulfonyl-ureas of the formula

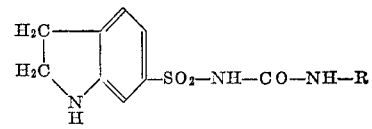

wherein R represents a member of the group consisting of lower alkyl, lower alkenyl, naphthyl, phenyl, halophenyl, lower alkoxyphenyl, lower alkyphenyl, phenyl-lower alkyl, halophenyl-lower alkyl, lower alkoxyphenyl-lower alkyl, lower alkylphenyl-lower alkyl, cycloalkyl of 4 to 6 carbon atoms, cycloalkyl-lower alkyl wherein said cycloalkyl has 4 to 6 carbon atoms, lower alkoxy-lower alkyl and lower alkylthio-lower alkyl, which comprises reducing at a temperature below about room temperature the nitro group of a compound of the formula

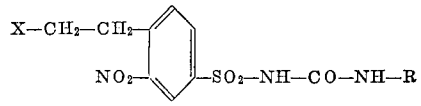

wherein X represents halogen and R has the same meaning as above, and cyclizing the resulting 4-amino derivative by heating at a temperature of about 100° C. in the presence of an acid binding agent.

2. A process for the production of 1-(indoline-6-sulfonyl)-3-lower alkylurea which comprises catalytically hydrogenating at a temperature below about room temperature 1 - [3-nitro-4-(β-haloethyl)benzenesulfonyl]-3-lower alkylurea to produce 1-[3-amino-4-(β-haloethyl)benzenesulfonyl]-3-lower alkylurea and cyclizing the last named product by heating at about 100° C. in the presence of alkali metal hydroxide.

3. A process for the production of 1-(indoline-6-sulfonyl)-3-cycloalkylurea which comprises catalytically hydrogenating at a temperature below about room temperature 1 - [3-nitro-4-(β-haloethyl)benzenesulfonyl]-3-cycloalkylurea to produce 1-[3-amino-4-(β-haloethyl)benzenesulfonyl]-3-cycloalkylurea and cyclizing the last named product by heating at about 100° C. in the presence of alkali metal hydroxide.

4. A process for the production of 1-(indoline-6-sulfonyl)-3-cyclohexylurea which comprises catalytically hydrogenating at a temperature below about room temperature 1-[3-nitro-4-(β-chloroethyl)benzenesulfonyl]-3-cyclohexylurea to produce 1-[3-amino-4-(β-chloroethyl)benzenesulfonyl]-3-cyclohexylurea and cyclizing the last named product by heating at about 100° C. in the presence of sodium hydroxide.

5. A process for the production of indoline-6-sulfonylureas of the formula

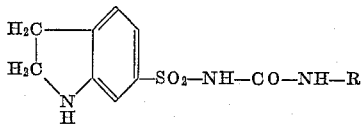

wherein R represents a member of the group consisting of lower alkyl, lower alkenyl, naphthyl, phenyl, halophenyl, lower alkoxyphenyl, lower alkylphenyl, phenyl-lower alkyl, halophenyl-lower alkyl, lower alkoxyphenyl-lower alkyl, lower alkylphenyl-lower alkyl, cycloalkyl of 4 to 6 carbon atoms, cycloalkyl-lower alkyl wherein said cycloalkyl has 4 to 6 carbon atoms, lower alkoxy-lower alkyl and lower alkylthio-lower alkyl, which comprises heating at a temperature of about 100° C. in the presence of acid binding agent a compound of the formula

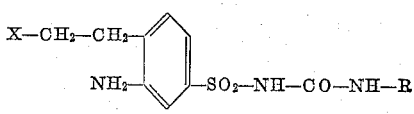

wherein X represents halogen and R has the same meaning as above.

6. A process for the production of indoline-6-sulfonylureas of the formula

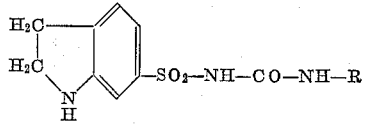

wherein R represents a member of the group consisting of lower alkyl, lower alkenyl, naphthyl, phenyl, halophenyl, lower alkoxyphenyl, lower alkylphenyl, phenyl-lower alkyl, halophenyl-lower alkyl, lower alkoxyphenyl-lower alkyl, lower alkylphenyl-lower alkyl, cycloalkyl of 4 to 6 carbon atoms, cycloalkyl-lower alkyl wherein said cycloalkyl has 4 to 6 carbon atoms, lower alkoxy-lower alkyl and lower alkylthio-lower alkyl, which comprises catalytically hydrogenating at a temperature below about room temperature in aqueous alkali solution a compound of the formula

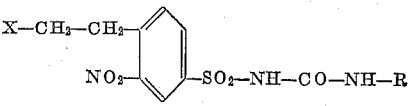

wherein X represents halogen and R has the same meaning as above.

7. A process for the production of 1-(indoline-6-sulfonyl)-3-cyclohexylurea which comprises hydrogenating at a temperature below about room temperature 1-[3-nitro - 4 - (β-chloroethyl)benzenesulfonyl]-3-cyclohexylurea in aqueous ammonia in the presence of Raney nickel.

No references cited.